Figure 1:
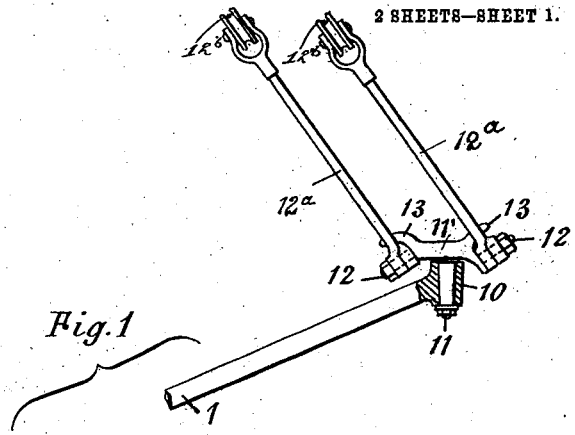

No. 749,916. PATENTED JAN. 19, 1904.
E. CANTONO.
TROLLEY FOR OVERHEAD ELECTRICAL CONDUCTOR SYSTEMS.
APPLICATION FILED AUG. 3, 1903.
NO MODEL. 2 SHEETS—SHEET 1.

Witnesses:

Inventor
Eugenio Cantono
By
James L. Norris
Atty.

No. 749,916. PATENTED JAN. 19, 1904.
E. CANTONO.
TROLLEY FOR OVERHEAD ELECTRICAL CONDUCTOR SYSTEMS.
APPLICATION FILED AUG. 3, 1903.
NO MODEL. 2 SHEETS—SHEET 2.
*Fig. 3*
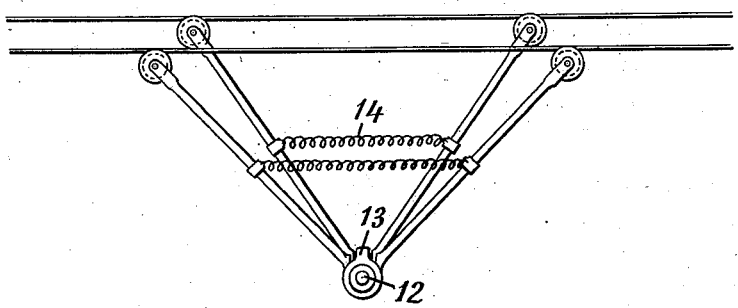
*Fig. 4* 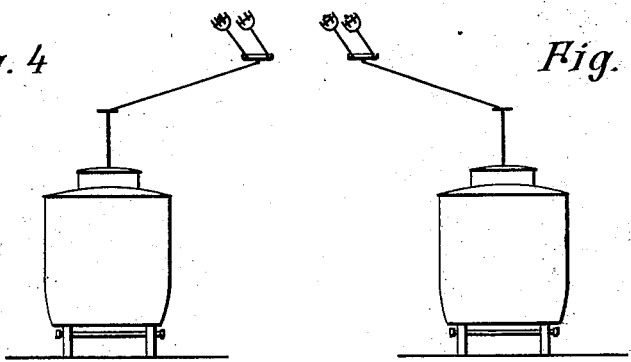 *Fig. 5*
*Fig. 6* 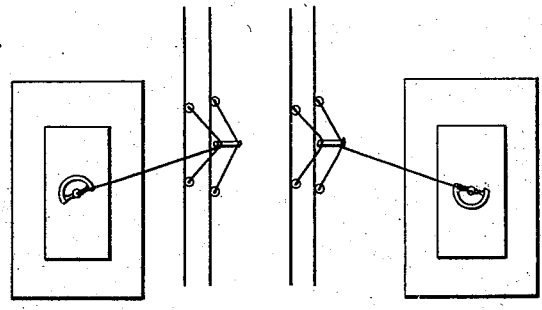 *Fig. 7*
Witnesses:
Inventor
Eugenio Cantono
By James L. Norris
Atty.

No. 749,916. Patented January 19, 1904.

UNITED STATES PATENT OFFICE.

EUGENIO CANTONO, OF ROME, ITALY.

TROLLEY FOR OVERHEAD-ELECTRICAL-CONDUCTOR SYSTEMS.

SPECIFICATION forming part of Letters Patent No. 749,916, dated January 19, 1904.

Application filed August 3, 1903. Serial No. 168,103. (No model.)

*To all whom it may concern:*

Be it known that I, EUGENIO CANTONO, captain of engineers in the Italian army, a subject of the King of Italy, residing at No. 15 Via degli Astalli, Rome, in the Kingdom of Italy, have invented certain new and useful Improvements in Trolleys for Overhead-Electrical-Conductor Systems, of which the following is a specification.

This invention has reference to trolleys for overhead-electrical-conductor systems, and has for its object an improved type of trolley for vehicles for ordinary roads and also the provision of a trolley which owing to the sensitiveness of its parts may advantageously be employed in place of other types, even for vehicles running upon rails.

In order to secure good current-taking contact, I proceed in the following manner: Upon each wire bear two rollers, each of which is carried by a small arm or rod. These small arms or rods, arranged in the manner of a fan, tend to approach each other under the influence of suitable springs, and the pivot of these arms is supported by an arm adapted to rotate horizontally at the extremity of the large pole employed in all trolley systems, which pole is supported in its turn by a vertical pole fixed to the vehicle and which fulfils the function of a pivot. The large pole, contrary to what is the case in ordinary trolleys, is not free in its movements of rotation around the vertical pivot, but, on the contrary, is constantly acted upon by a spring, which tends to produce by reason of the rotation in a given direction of the said pole around the pivot proper the closing of the angle which it may form with its initial position—that is to say, the position which it occupies when the rollers are not supported upon the wires. By utilizing this displacement and that common to all trolley-poles, which takes place in the vertical direction, the bottom of the groove of the rollers is maintained constantly in contact with the line-wires whatever movement the vehicle may execute with respect to them. In order that the pressure between the wires and the rollers may be exerted constantly upon the bottom of the groove of these latter and not upon their sides, there is imparted to the plane formed by the two small rods arranged fanwise an inclination corresponding to the direction of the resultant of the efforts which the two large springs exert upon the pole.

A manner of carrying the invention into practice is represented in the accompanying drawings, in which—

Figure 2:
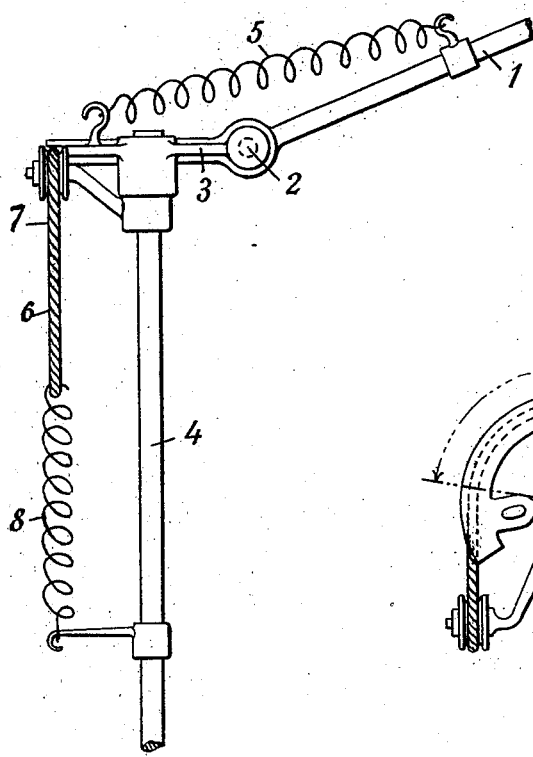
Figure 2:
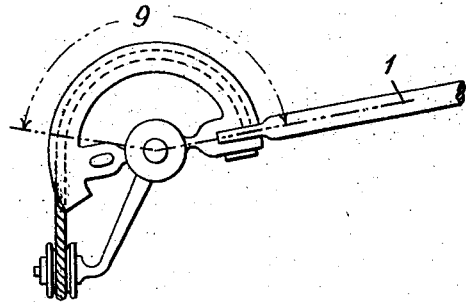

Figure 1 is an elevation of a trolley embodying this invention. Fig. 2 is a horizontal projection. Fig. 3 illustrates the fanwise arrangement of the small rods. Figs. 4 and 6 are respectively an elevation and a plan view of the vehicle with trolley for wires arranged upon the right-hand side of the roadway. Figs. 5 and 7 are respectively an elevation and a plan view of a vehicle with trolley for wires placed upon the left-hand side.

A rod 1, Fig. 1, is pivoted in such a manner as to be adapted to oscillate in a vertical plane around a pivot 2, carried by an arm 3, capable of rotating around a pivot 4, fixed to the vehicle. A spring 5, fixed by one extremity to the arm 3 and by the other to the rod 1, tends to maintain this latter raised. A cable fixed upon the arm 3 and adapted to turn upon the pulley 7 tends, by means of the spring 8, to limit the angle 9, Fig. 2, of rotation of the rod 1 around the rod 4. The rod 1 is provided at its free extremity with a circular slot, into which enters a pivot 11, which is guided therein in a vertical direction. Upon the upward prolongation of the said pivot in the case of a single-line trolley and upon a horizontal arm 11', supported by the same, in the case of a trolley for several lines are pivoted, as at 12, the small rods or arms $12^a$, which carry the contact-rollers $12^b$.

As shown in Figs. 3, 4, 5, 6, and 7, two rollers supported by two different rods bear against each wire. These two rods converge toward the point 12, where they pivot in such a manner as to be caused to move in a plane inclined to the vertical. A tappet or stop 13 prevents the two rods from approaching each other beyond a certain limit, while a spring 14 tends to bring them together in opposition to the resultant of the effort exerted by the two springs 5 and 8 by means of the rod 1, which in pressing the rollers toward the wires tends to cause them to diverge—that is to say, to separate one from the other. The employment for each wire of two rollers supported by the two small rods arranged fanwise instead of a single rod serves to place the pivot of rotation 12 of the small rods at the apex of a triangle, the side of which opposite to this apex is formed by the portion of the line-wire comprised between the rollers. These latter being in their turn maintained by the small rods in the plane of the triangle will necessarily invariably be situated in the plane of the line-wire. The inclination of the plane in which the rods move (plane of the triangle) with respect to the vertical plane passing through the wire is given by the inclination upon the arm 12 of the resultant applied to the same arm of the two forces acting upon it—that is to say, the spring 5, which tends to lift it, and the spring 8, which tends to cause it to rotate in a horizontal plane around the pivot 4 in a direction diminishing the amplitude of the angle 9. The component of the said two efforts being therefore in the same plane as the two rods, which is also that of the two rollers, will have for sole effect, and this the desired effect, an action such that the bottom of the groove of the roller is constantly pressed against the wires, as above stated. The two small rods being arranged in the same plane and being adapted within fairly wide limits to cause the two rollers to mutually approach and recede with the closing and opening of the angle comprised between the small rods themselves, it follows that contact between the rollers and wires is assured, even when the arm which supports the pivots 12 is not maintained horizontal or even when the wires are not maintained at the same height above the ground, (see Figs. 1 and 3,) and the distances between the different wires and the point around which the respective small rods pivot upon the said arm are not equal. In addition the lightness of the small rods, due to their small length, permits of their executing speedier movements than those effected by the ordinary rod 1, from which it follows that the contact is constantly maintained in the case of small and rapid displacements and at the commencement of large displacements. This being the arrangement, it follows that the vehicle may move to either side of the line-wires or travel beneath them, while the rod rotates around the supporting-pivot 4, the small rods of the rollers rotating with it around the pivot 4; but in their different positions relatively to this latter they will remain arranged in planes and always parallel one with the other and in a constant position relatively to the line-wires.

In Figs. 4 and 5 are diagrammatically represented two vehicles, the first with its maximum displacement to the left hand and the second with a maximum right-hand displacement. From the said figures it is apparent that the maximum displacement is not equal in the two parts of the wires, since in one, Figs. 4 and 5, from the maximum displacement permitted by the rod 1 must be deducted that due to the inclination of the two small rods carrying the rollers, while in the other it must be added.

What I claim, and desire to secure by Letters Patent of the United States, is—

A trolley comprising a vertical rod, a pole, a horizontally-rotatable means carried by the rod, said means pivotally connected to one end of the rod, a spring connection between said means and pole for lifting the latter, a spring connection between said rod, and means adapted to rotate the latter, imparting a like movement to the pole, a horizontally-rotatable arm carried by the free end of said pole, a pair of rods pivotally connected to said arm and arranged in a fan-like manner, and a roller carried on the free end of each of said rods of said pair of rods.

In testimony whereof I have hereunto set my hand, in presence of two subscribing witnesses, this 22d day of July, 1903.

EUGENIO CANTONO.

Witnesses:
 G. R. ZANARDO,
 A. RAGGI.